United States Patent [19]

Nitschke

[11] Patent Number: 4,625,309
[45] Date of Patent: Nov. 25, 1986

[54] MONITORING CIRCUIT WITH POWER-UP INTERVAL SAFEGUARD FOR A MICROCOMPUTER

[75] Inventor: Werner Nitschke, Ditzingen, Fed. Rep. of Germany

[73] Assignee: Robert Bosch GmbH, Stuttgart, Fed. Rep. of Germany

[21] Appl. No.: 548,499

[22] Filed: Nov. 3, 1983

[30] Foreign Application Priority Data

Nov. 4, 1982 [DE] Fed. Rep. of Germany ....... 3240706

[51] Int. Cl.⁴ .............................................. G06F 11/00
[52] U.S. Cl. ......................................... 371/12; 371/62
[58] Field of Search ............... 371/12, 62; 364/431.11, 364/200, 900

[56] References Cited

U.S. PATENT DOCUMENTS

| 4,245,315 | 1/1981 | Barman et al. | 364/431.11 |
| 4,255,789 | 3/1981 | Hartford et al. | 364/431.11 |
| 4,282,574 | 8/1981 | Yoshida et al. | 371/12 |
| 4,338,599 | 7/1982 | Leininger | 364/900 |
| 4,399,537 | 8/1983 | Jones | 371/62 |
| 4,400,783 | 8/1983 | Locke, Jr. et al. | 364/900 |
| 4,418,398 | 11/1983 | Hornung | 364/900 |
| 4,433,413 | 2/1984 | Fasang | 364/900 |
| 4,512,019 | 4/1985 | Bodig et al. | 371/12 |
| 4,528,629 | 7/1985 | Breitling | 364/431.11 |
| 4,541,050 | 9/1985 | Honda et al. | 371/62 |

FOREIGN PATENT DOCUMENTS 2035633 6/1980 United Kingdom ................. 371/12

Primary Examiner—Charles E. Atkinson
Attorney, Agent, or Firm—Frishauf, Holtz, Goodman & Woodward

[57] ABSTRACT

A capacitor (12) which, by its charge or discharge, times the interval between successive signals at a computer output point which is being monitored so as to provide a reset signal to the computer when the interval exceeds a predetermined normal value, is held in a charge condition which produces a reset signal to the computer component, for a predetermined time after power is turned on. In one embodiment a transistor in circuit with resistances and another capacitance is used for that function and in another embodiment an additional comparator responsive to the rise of the supply voltage up to a threshold value provides that function. The circuit can be designed to provide reset signals of either logic value (0 or 1).

8 Claims, 2 Drawing Figures

MONITORING CIRCUIT WITH POWER-UP INTERVAL SAFEGUARD FOR A MICROCOMPUTER

The present invention concerns monitoring circuits from electronic calculating components such as the microcomputers that are used in a dedicated manner for motor vehicles, household appliances or the like. Such circuits sometimes referred to as "watchdog circuits," operate to reset an electronic computing component such as a microprocessor in order to make possible a renewed program start whenever the output signals of the processor component do not maintain a prescribed rhythm. Such circuits are known, for example, from published German patent applications DE-OS No. 29 03 638, DE-OS No. 30 35 896 and DE-OS No. 32 14 006. What is monitored in these cases, in particular, is the maintainance of a certain maximum permissible timespacing of the output signals. Problems arise in these known systems when the supply voltage is switched on, because at this moment the monitored output (port) of the computing component in general does not yet have a defined signal condition. Such an undefined signal could, for example, be mistaken for a control signal occurring in the running of a program, as a result of which the initializing reset signal would be removed. The computing component would then begin to operate under inadequate supply voltage conditions.

SUMMARY OF THE INVENTION

It is an object of the present invention to prevent malfunctioning of an electronic computing component, in spite of its normal monitoring circuit, in the period immediately following the turning on of the supply voltage, sometimes referred to as a "power-up" period.

Briefly, during a period of time immediately following turning on the supply voltage which is dependent upon the value of the supply voltage, a capacitor which is normally used to time the intervals between signals of the monitor output of the computing component by causing a comparator to switch the course of the charging or discharging of the capacitor, is held at a fixed condition of charge which produces a reset signal at the output of the comparator. Such an arrangement has the advantage that when the supply voltage is switched on for the computing component, a reset signal is supplied to that component in every case for a certain time, independently of what signal, if any, may happen to be present at the monitored output of the computing component.

It is particularly advantageous to provide a second comparator, to which the supply voltage is applied through a voltage divider, so that after a predetermined voltage threshold is reached, its output condition will change, causing the first comparator to be provided with a potential that terminates the reset condition. Since a reset signal at the output of the first comparator affects this voltage divider in the sense in which a supply voltage below a prescribed value puts the capacitor in the charge condition in which a reset signal is provided at the output of the first comparator, two advantageous effects are obtained: first, independently of the signal condition of the monitored output of the computing component when the supply voltage is turned on, this component is kept in the reset condition for a certain period (until a prescribed voltage is reached) and, second, when a reset signal is produced during operation of the computing component (e.g. as the result of an excessively great output signal spacing) the reset condition is maintained insofar as the supply voltage is less than a prescribed value. This is obtained by the interlock function of the circuit above mentioned. This interlocking, however, does not take place as soon as the supply voltage falls below a threshold into an impermissible range, but only when, thereafter, the computer output signals deviate from their prescribed rhythm.

BRIEF DESCRIPTION OF THE DRAWINGS

The invention is further described by way of illustrative example with reference to the annexed drawings, in which.

DESCRIPTION OF THE ILLUSTRATED EXAMPLES

Figure 1:
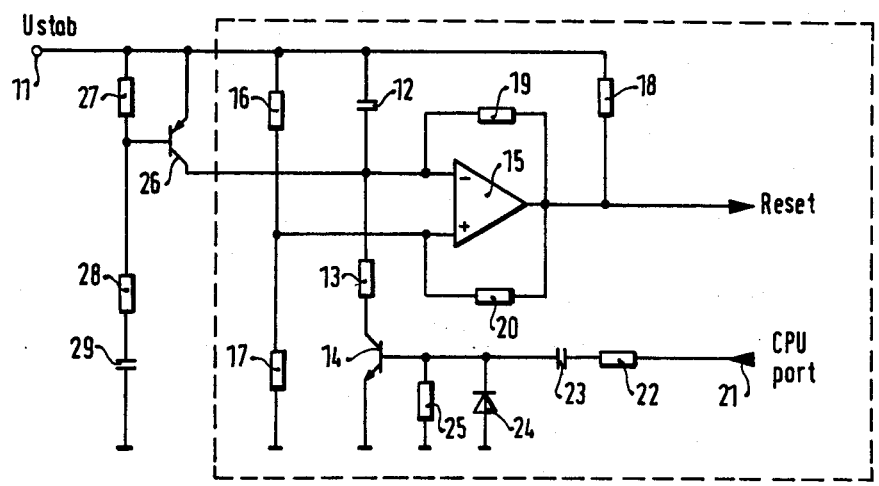
FIG. 1 is a circuit block diagram of a first embodiment of a computer monitoring system according to the invention.

The first embodiment shown in FIG. 1 has a stabilized voltage source 11 represented by a terminal at which the voltage $U_{stab}$ appears to which there is connected, among other things one terminal of the capacitor 12 which has another terminal connected to ground through a resistance 13 and, in series therewith, the collector-emitter path of a transistor 14. The inverting input of an operational amplifier connected as a comparator 15 is connected to the common connection of the capacitor 12 and the resistance 13. The noninverting input of the comparator 15 is connected to resistances 16 and 17 that together form a voltage divider, with the resistance 16 being connected to the voltage source 11 and the resistance 17 to the ground line, which may be a chassis connected line in the case of a vehicle. A resistance 18 connected to the output of the comparator 15 is connected at its other end to the voltage source 11, while resistances 19 and 20, also connected to the output of the comparator 15, lead back respectively to the inverting and noninverting inputs of the comparator.

The output of the comparator 15 is also connected to the reset input of an electronic computing component, typically a microcomputer, this component not being shown in the drawing. An input 21 to the circuit of FIG. 1 is connected with an output port of the same microcomputer where periodic output signals appear in normal operation of the microcomputer which are required to maintain a certain maximum time spacing from each other. A resistance 22 leads from the input 21 to a series capacitor 23 which in turn leads to the base of the transistor 14.

The generation of the aforesaid periodic signals that are provided to the input 21 results from the fact that at a defined stage in the running of the program of the microcomputer, which stage is run through in every cycle of every program, there is provided a command to supply a voltage pulse over a particular output channel generally referred to as a port. In normal program running these pulses accordingly come at fixed time intervals.

For protection of the transistor 14 a resistance 25 and a diode 24 are connected to the base of the transistor, both of which have their respective other ends connected to ground.

The voltage source 11 and the inverting input of the comparator 15 are connected together through the switch transistor 26. The series connection of two resistances 27 and 28 with a capacitor 29 is interposed between the voltage source 11 and ground. The electrical junction between the resistances 27 and 28 is connected to the base of the transistor 26.

The circuit of the components 11–25 is known from the disclosure of DE-OS No. 30 35 896 cited at the beginning of the specification, in which document their function is described in detail. In what follows, therefore, this function is given only brief further mention here. When the supply voltage is switched on, the potential at the inverting input of the comparator is higher than at the known inverting input. A zero-signal is then obtained at the output of the operation amplifier, which serves to reset the microcomputer connected to the circuit of FIG. 1. If now the components 26–29 are disregarded, the capacitor 12 will be charged over the resistance 19, so that after a prescribed time the comparator 15 will switch over. At its output will then appear a 1-signal, that now discharges the capacitor 12 over the resistance 19. After termination of the reset operation a program now begins to run in the microcomputer, which is so constituted that after the running of a program or at certain time intervals during a longer program, pulses are supplied to the terminal 21 over an output of the microprocessor. With the appearance of such a pulse, the transistor 14 is made conducting and the capacitor 12 is very quickly charged. After the blocking of the transistor the capacitor 12 discharges again over the resistance 19. If an error occurs in the running of the program, which in the case of properly checked out (debugged) programs is usually produced by voltage failures (outages) the next pulse of the series at the input 21 does not arrive in proper time. The capacitor 12 discharges then so far that the upper threshold voltage of the comparator is reached and the comparator switches over, so that at its output again a reset pulse appears. By feedback over the resistance 20 this event is also made noticable at the noninverting input of the operational amplifier 15 by a voltage collapse. The capacitor is again discharged over the resistance 19 until the lower threshold is reached. Then the comparator output switches back to a 1-signal, the microcomputer is again ready to start and a new program run can begin.

When the supply voltage is switched on, which occurs for both the microcomputer and the circuit of FIG. 1 at the same time, undefined conditions at first persist for a while at the output of the microcomputer. It can thus occur that immediately after switching on the supply voltage a 1-signal is applied to the terminal 21, whereby the capacitor 12 is immediately discharged. As above described, a reset signal would then immediately be removed at the output of the comparator 15 and the microcomputer would be started before the supply voltage should have stabilized itself and before defined initial conditions are established. In order to prevent that difficulty, the circuit 26–29 has the effect that when the supply voltage is switched on, the capacitor 12 is short-circuited by the switching path of the transistor 26. In consequency the reset signal at the output of the comparator 15 is maintained, independently of whatever signal, if any, is present at the terminal 21. After a period of time fixed by the dimensioning of the components 27, 28 and 29, the capacitor 29 is charged to such an extent that the transistor 26 becomes blocked and the reset signal is removed in accordance with the process previously described.

Figure 2:
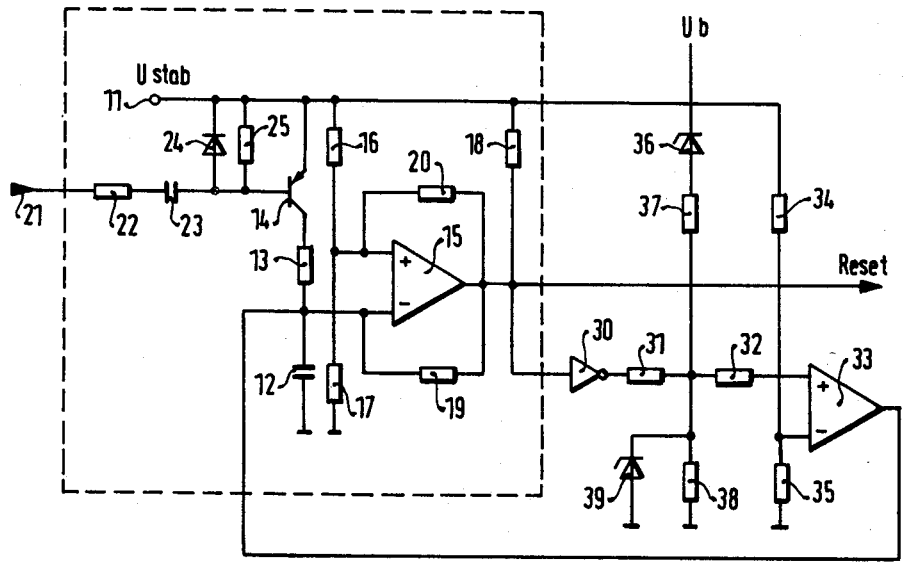
FIG. 2 is a circuit block diagram of a second embodiment according to the invention.

The part of FIG. 2 enclosed in the broken-line rectangle corresponds essentially to the part of FIG. 1 that is likewise enclosed in a broken rectangle, which is the heretofor known part of the circuit of FIG. 1. As a variation from FIG. 1, the components 24, 25 and 14 in FIG. 2 are now connected to the voltage source 11 instead of with ground. The transistor 14 is now of the opposite conductivity type and the capacitor 12 is connected to the ground instead of to the voltage source 11. This modified circuit is used when the microcomputer requires a 1-signal as a reset signal instead of a 0-signal. The two circuits are thus constituted in what is essentially a mutually complementary fashion.

The components 26–29 are dispensed with in FIG. 2. The output of the comparator 15 is now connected over the series circuit composed of an inverter 30 and two resistances 31 and 32 to the noninverting input of another comparator 33, the output of which is connected to the inverting input of the first comparator 15. A voltage divider composed of two resistances 34 and 35 connected between the voltage source 11 and ground has its tap connected to the inverting input of the comparator 33. A supply voltage, in particular, a battery voltage $U_b$ is connected over the series circuit composed of a Zener diode 36 and two resistances 37 and 38 over to ground. Another Zener diode 39 is connected in parallel to the resistance 38. The junction point of the resistances 37 and 38 is connected to the junction between the resistances 31 and 32.

The manner of operation of the part of the circuit bounded by the broken-line rectangle corresponds to the manner of operation of the corresponding part of the first embodiment except for the fact that a 1-signal is produced instead of a 0-signal for the reset circuit. So long as a 0-signal is present at the output of the comparator 15 and, therefore, the microcomputer is operating at a regular fashion, the circuit 30–39 has no influence on the function of the circuit 11 to 25, since the 1-signal produced at the output of the inverter 30 raises the potential at the noninverting input of the comparator 33 above the potential at the inverting input. The output of the comparator 33 (which has an open collector) therefore blocks and has no effect at all on the capacitor 12.

Whenever at the beginning of operation the supply voltage $U_b$ is switched on, the output of the comparator 33 is at first conducting, i.e. the capacitor is short circuited only when, as a result of the rising supply voltage $U_b$, the potential at the noninverting input of the comparator 33 rises above the potential at the inverting input of the same comparator, the output of this comparator 33 blocks and thereby removes the short circuit of the capacitor 12. In that manner the effect is produced that the reset signal at the output of the comparator 15 can be removed, at the earliest, when an adequate supply voltage has been assured.

The second function of the circuit 33 to 39 is the function of producing the 0-signal at the output of the inverter 30 when a reset signal (1-signal) is produced at the output of the comparator 15. The battery voltage $U_b$ must now be greater than the voltage threshold provided by the resistances 31, 32, 37 and 38 in order to prevent the capacitor 12 from being short-circuited. This short-circuiting of the capacitor 12 would produce a compulsory reset signal by which the microcomputer would be kept reset until the battery voltage $U_b$ oversteps again the voltage threshold provided by the resistance 31, 32, 37 and 38. It is thus assured that in the case of insufficient battery voltage the microcomputer will be prevented from making a renewed program start.

The Zener diode 39 protects the noninverting input of the comparator 33 against positive voltage peaks of the battery voltage $U_b$ which is here used, for example, as the supply voltage. In the case of negative voltage peaks current limiting is produced by the resistance 32. The Zener diode 36 is so dimensioned that the battery voltage $U_b$ affects the potential at the common connection of the resistances 31, 32, 37 and 38 only above a prescribed voltage. The Zener diode 39 provides an increase of the resolution (definitiveness) of the desired voltage threshold.

Although the invention has been described with reference to two particular illustrative examples, it should be understood that further modifications and variations are possible within the inventive concept. For example, instead of the provision of a discharge down to a lower threshold, a charging up to an upper threshold can in principle serve the same purpose. Instead of short-circuiting of a capacitor like the capacitor 12, basically the capacitor voltage could be set at a particular value through a corresponding circuit arrangement 26, 33, i.e. the capacitor 12 can be connected to a defined voltage source.

I claim:

1. Electric circuit apparatus for monitoring an electronic computer component which provides periodic signals at one of its outputs during normal operation, including a capacitor connected to a charge/discharge circuit controllable by said periodic signals and connected also to a comparator in such a manner that when the charge of said capacitor reaches a predetermined voltage value, said comparator provides a reset signal for said computer component, said apparatus including the improvement which comprises:

circuit means (26,33) for maintaining said very same capacitor (12) at a condition of charge which corresponds to the provision of a reset signal at the output of said comparator (15), regardless of any signal at said output of said computer component, during a period beginning with the turning on of a supply voltage both for said apparatus and for said computer component and ending at a time dependent upon the value of said supply voltage and independent of said periodic signals.

2. Circuit apparatus according to claim 1 in which said circuit means comprise a semiconductor switch (26) controlled by the value of the supply voltage through a resistance-capacitance circuit branch (27–29).

3. Circuit apparatus according to claim 2 in which said semiconductor switch (26) is connected in parallel with said capacitor (12) and is connected to said resistance-capacitor circuit branch (27–29) in such a way that said semiconductor switch (26) becomes nonconducting after a prescribed period of time.

4. Circuit apparatus according to claim 1 in which said circuit means comprises a second comparator (33) having its inputs connected in a resistive circuit connected to said supply voltage such that the output condition of said second comparator (33) changes when the supply voltage reaches a predetermined voltage threshold, the output of said second comparator being connected to said capacitor in such a way that upon the switching on of the supply voltage, said capacitor (12) is at first short-circuited by the output of said second comparator (33) and remains short-circuited until the supply voltage reaches said threshold.

5. Circuit apparatus according to claim 4 in which a voltage divider (37,38) for the supply voltage is provided having a tap connected to one input of said second comparator and connected to a circuit branch (30, 31) connected to the output of said first comparator in such a way that when the supply voltage is less than said predetermined threshold voltage after the output of said first comparator produces a reset signal, said capacitor (12) is put, by means of its connection to said second comparator (33), in the charge condition which produces a reset signal at the output of said first comparator (15) until the supply voltage reaches said threshold.

6. Circuit apparatus according to claim 5 in which through an element (30) of said circuit branch (30,31) said reset signal at the output of said first comparator (15) is furnished as a null signal through a resistance (31) to the tap of said voltage divider (37,38).

7. Circuit apparatus according to claim 6 in which a Zener diode (36) is interposed in series with or in said voltage divider.

8. Circuit apparatus according to claim 6 in which the part (38) of said voltage divider which is connected to ground is bridged by a second Zener diode (39).

* * * * *